US011530641B2

(12) United States Patent
Romana et al.

(10) Patent No.: US 11,530,641 B2
(45) Date of Patent: *Dec. 20, 2022

(54) PRESSURIZED AIR INDUCTION SYSTEM

(71) Applicant: Ford Global Technologies, LLC, Dearborn, MI (US)

(72) Inventors: Jagjit Romana, NorthVille, MI (US); Oliver Martinovski, Shelby, WI (US); Kyle Ebner, Pinckney, MI (US); Jacquita McKinney, Southfield, MI (US); Christian Roxin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,531

(22) Filed: Oct. 11, 2021

(65) Prior Publication Data

US 2022/0025810 A1 Jan. 27, 2022

Related U.S. Application Data

(62) Division of application No. 16/803,357, filed on Feb. 27, 2020, now Pat. No. 11,193,415, which is a (Continued)

(51) Int. Cl.
*F02B 29/04* (2006.01)
*F02D 41/00* (2006.01)
*F02D 11/10* (2006.01)
*F02D 9/02* (2006.01)
*F02D 41/10* (2006.01)

(52) U.S. Cl.
CPC ...... *F02B 29/0418* (2013.01); *F02B 29/0462* (2013.01); *F02D 11/106* (2013.01); *F02D 41/0005* (2013.01); *F02D 41/0007* (2013.01); *F02D 41/10* (2013.01); *F02D 9/02* (2013.01); *F02D 41/107* (2013.01); *F02D 2200/1002* (2013.01)

(58) Field of Classification Search
CPC .. F02B 29/04; F02B 29/0418; F02B 29/0426; F02D 9/02; F02D 11/106; F02D 41/0005; F02D 41/0007; F02D 41/10; F02D 41/107
See application file for complete search history.

(56) References Cited

U.S. PATENT DOCUMENTS

| 4,900,343 A | 2/1990 | Minami et al. |
| 6,561,169 B2 | 5/2003 | Sealy et al. |

(Continued)

FOREIGN PATENT DOCUMENTS

WO 2005024202 A1 3/2005

*Primary Examiner* — John Kwon
*Assistant Examiner* — Johnny H Hoang
(74) *Attorney, Agent, or Firm* — Vincent Mastrogiacomo; McCoy Russell LLP

(57) ABSTRACT

Methods are provided for engines. In one example method, at higher engine load, cool compressed air is drawn into an engine via an air intake passage, and at lower engine load, ambient air is drawn into the engine via a duct while retaining cooled compressed air in the air intake passage. The compressed air may be released from the air intake passage based on heat transferred to the compressed air during the lower engine load, in at least one example.

5 Claims, 7 Drawing Sheets

Related U.S. Application Data division of application No. 15/826,401, filed on Nov. 29, 2017, now Pat. No. 10,612,455.

(56) References Cited

U.S. PATENT DOCUMENTS

| | | | |
|---|---|---|---|
| 6,705,084 B2 | 3/2004 | Allen et al. | |
| 6,735,945 B1 | 5/2004 | Hall et al. | |
| 7,100,584 B1 * | 9/2006 | Bruestle | F02B 29/0418 60/599 |
| 7,398,770 B2 * | 7/2008 | Acuna, Sr. | F02B 29/0412 123/542 |
| 7,779,634 B2 | 8/2010 | Barthelet et al. | |
| 8,371,121 B2 | 2/2013 | Gödeke et al. | |
| 9,938,913 B2 | 4/2018 | Dudar | |
| 11,193,415 B2 * | 12/2021 | Romana | F02B 29/0462 |
| 2013/0205774 A1 | 8/2013 | Styles et al. | |
| 2014/0047833 A1 | 2/2014 | Buckland et al. | |
| 2014/0048049 A1 | 2/2014 | Glugla et al. | |
| 2014/0075976 A1 | 3/2014 | Glugla et al. | |
| 2018/0149121 A1 | 5/2018 | Owen et al. | |
| 2019/0162109 A1 | 5/2019 | Romana et al. | |

* cited by examiner

PRESSURIZED AIR INDUCTION SYSTEM

CROSS REFERENCE TO RELATED APPLICATION

The present application is a divisional of U.S. Non-Provisional patent application Ser. No. 16/803,357, entitled "PRESSURIZED AIR INDUCTION SYSTEM," and filed on Feb. 27, 2020, which is a divisional of application Ser. No. 15/826,401, entitled "PRESSURIZED AIR INDUCTION SYSTEM," and filed on Nov. 29, 2017. The entire contents of the above-referenced applications are hereby incorporated by reference for all purposes.

FIELD

The present description relates generally to methods and systems for controlling a vehicle engine to provide a boosted air charge.

BACKGROUND/SUMMARY

By incorporating a turbocharger, comprising a compressor driven by a turbine, into an engine of a vehicle, the efficiency and power output of the engine may be improved. The forced induction of extra air into a combustion chamber of the engine proportionally induces the combustion of additional fuel, producing more power than obtained from air intake at ambient pressure. The pressurized, or boosted, air is typically heated during compression and if combusted directly, may increase the risk of engine knock. Thus, boosted air is typically cooled by flowing the air through a charge air cooler (CAC) before entering the engine intake manifold, a process that also increases the density of the air and improves intake throttle response.

The air compression provided by the compressor of the turbocharger is enabled by the rotation of the turbine. Typically, at least a portion of the exhaust gas is routed to the turbine and the expansion of the exhaust gas causes the turbine to spin. Since the turbine is mechanically coupled to the compressor, as the turbine spins up, so does the compressor. However, there may be a delay between the time when an increase in torque is demanded and when the corresponding boost pressure is provided by the compressor. The delay, also referred to as turbo lag, is due to the turbine's inertia and friction when operating at low engine loads, and corresponds to a duration required for the engine to generate sufficient exhaust gas (e.g., exhaust flow and temperature) to spool up the turbine to drive the compressor. During this turbo lag, boosted engine performance may be degraded.

Various approaches have been developed to address the issue of turbo lag including providing an alternative pathway for supplying air to the engine. One example approach is shown by Sealy et al. in U.S. Pat. No. 6,561,169. Therein, a charge air management system is disclosed wherein a first air duct supplies air at ambient pressure to an intake manifold and a second air duct flows cool, boosted air, from downstream of a charge air cooler (CAC), to the intake manifold. Air flow through the first air duct or the second air duct is controlled via a valve based on the engine's speed and load. During low loads, air is delivered via the first duct. During higher loads, cooled, dense air is delivered via the second duct and the CAC.

However, the inventors herein have recognized potential issues with such systems. There may be conditions where the air provided via the second duct does not improve boosted engine performance. In the approach of Sealy, closing of the valve during a low load condition allows cool and dense compressed air to be held within the second duct, and released when the valve is opened during a subsequent high load condition. Since the charge air management system of Sealy is adapted for infrequent demands on the turbocharger, the CAC is not operated during low load conditions to improve fuel economy. Consequently, based on ambient conditions, as well as a duration over which the compressed air is held in the second duct without operation of the CAC, the boosting potential of the compressed air may degrade. For example, during conditions when the ambient temperature or humidity is high, the density of the compressed air held in the second duct may decrease, reducing the engine's throttle response when the compressed air is subsequently released. If the CAC is operated while air is retained in the sealed second duct, the fuel economy benefit of the boosted engine may be lost.

In one example, the issues described above may be addressed by a method for reducing turbo lag comprising; at higher engine load, drawing cool compressed air into an engine via an air intake passage and at lower engine load, drawing ambient air into the engine via a duct while retaining cooled compressed air in the air intake passage. Additionally, compressed air is released from the air intake passage based on heat transferred to the compressed air during the lower engine load. In this way, boost pressure response time following a transient increase in torque demand can be improved.

As one example, a dual pathway air induction system may be adapted to an engine of a vehicle. The induction system may include a first air passage coupled to an intake manifold via a first throttle, the first air passage configured to deliver fresh air at ambient pressure to engine cylinders at low engine speed and loads. The induction system may further include a second air passage coupled to the intake manifold via a second throttle, the second passage including a turbocharger compressor and a CAC for delivering cool, compressed air to the engine cylinders during high engine speeds and loads. The first passage may be coupled to the second passage via a coupling, such as a T-body. Additionally, flow to each passage may be controlled via a splitter valve (e.g., a proportional valve) or via respective first and second throttle valves. Responsive to an operator tip-in, flow through the second passage may be increased while flow through the first passage is decreased. Responsive to a subsequent operator tip-out, CAC operation is disabled, flow through the first passage may be increased, and flow through the second passage is closed to trap an amount of cool, compressed air within the second passage. A rate of temperature rise of the trapped air is estimated while the second passage is closed. For example, heat transfer to the trapped air may be estimated as a function of ambient temperature, humidity, volume of air trapped, boost level attained before the second throttle was closed, etc. If the amount of heat transfer exceeds a threshold, such as when the inferred temperature of the trapped air exceeds a threshold temperature, the engine controller may open the second throttle and release the trapped warm air, even if a higher torque was not demanded. The first throttle may be correspondingly closed and one or more engine operating parameters may be adjusted (e.g., spark timing may be retarded from MBT) to reduce torque transients.

In this way, by trapping cool, compressed air within a duct, the duct can be used as a boost pressure reservoir that rapidly provides boost pressure to engine cylinders during a tip-in. As such, this reduces turbo lag. The technical effect of discharging the trapped compressed air while torque demand is low responsive to a rise in the inferred temperature of the trapped air is that boost performance of the engine can be maintained elevated. Specifically, only compressed air that is cool and dense, and therefore capable of improving throttle response when discharged, is trapped inside the duct. By discharging trapped air that is warm and less dense during conditions when boost demand is low, the adverse effect of the warm air on throttle response is reduced. The duct can be replenished with fresh air that is rapidly cooled during subsequent CAC operation. In this way, boosted engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

DETAILED DESCRIPTION

Figure 1:
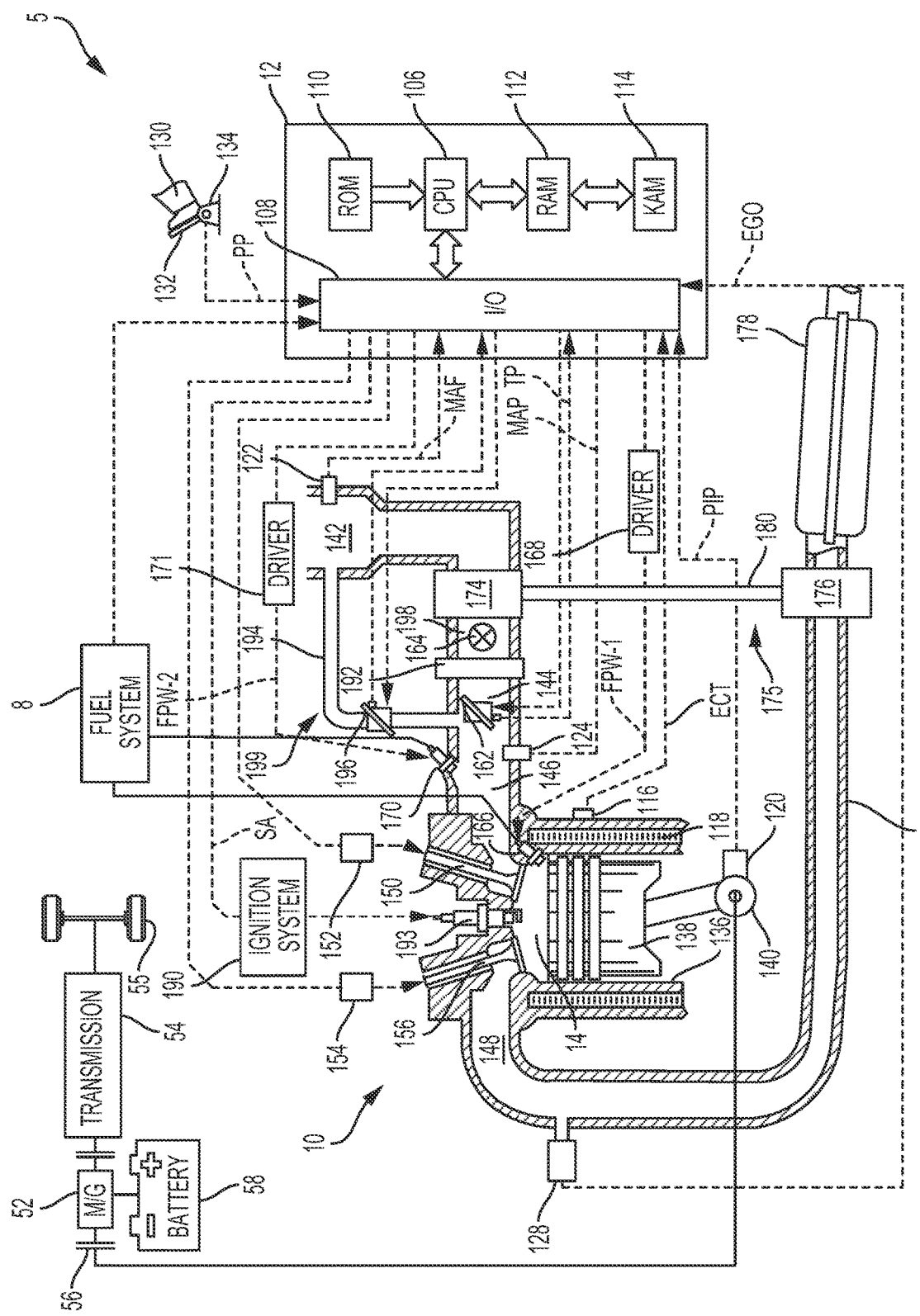
FIG. 1 shows an example engine system for a single turbo boosted hybrid vehicle.
Figure 2:
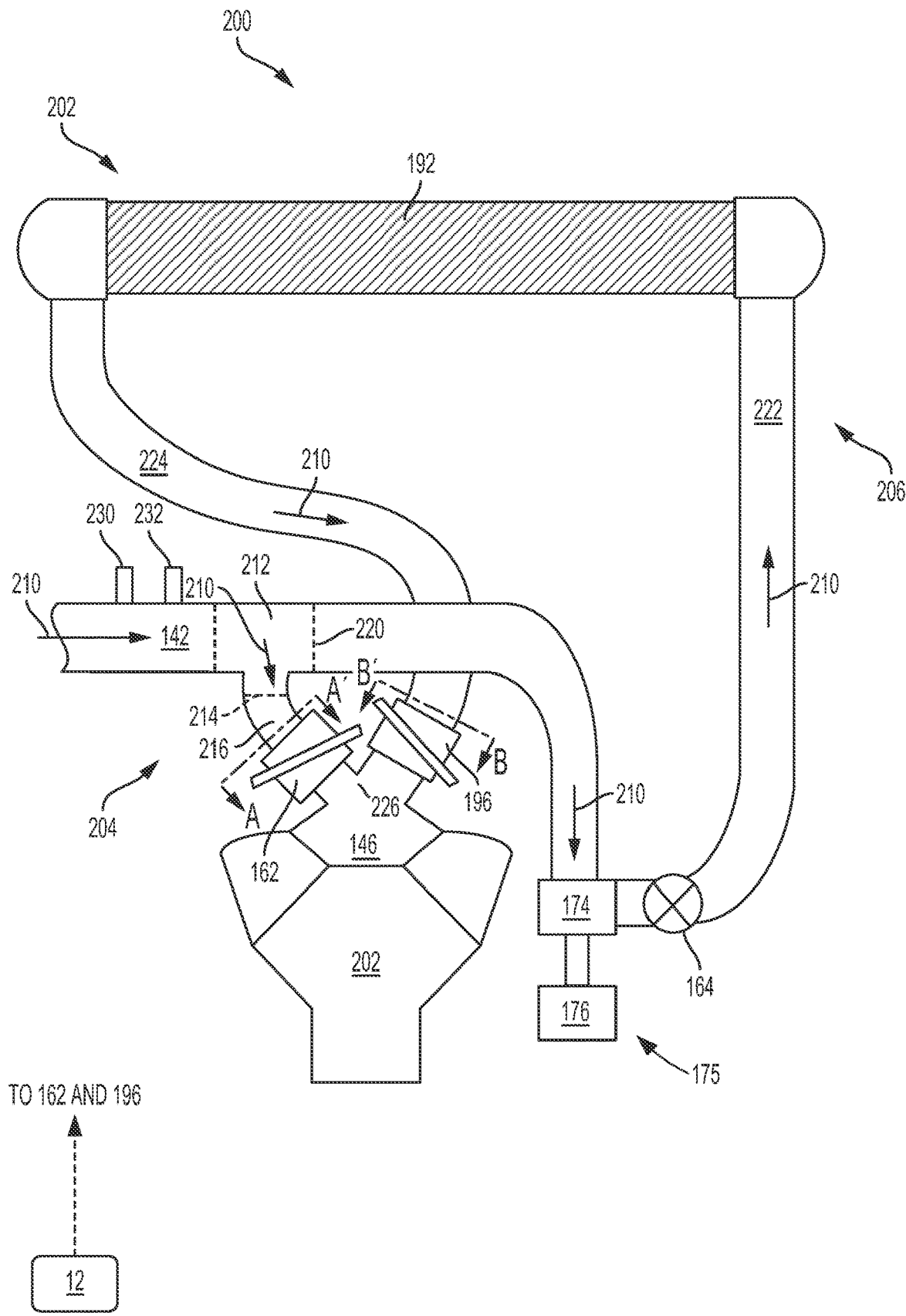
FIG. 2 shows a schematic illustration of an engine adapted with a pressurized air induction system.
Figure 3A:
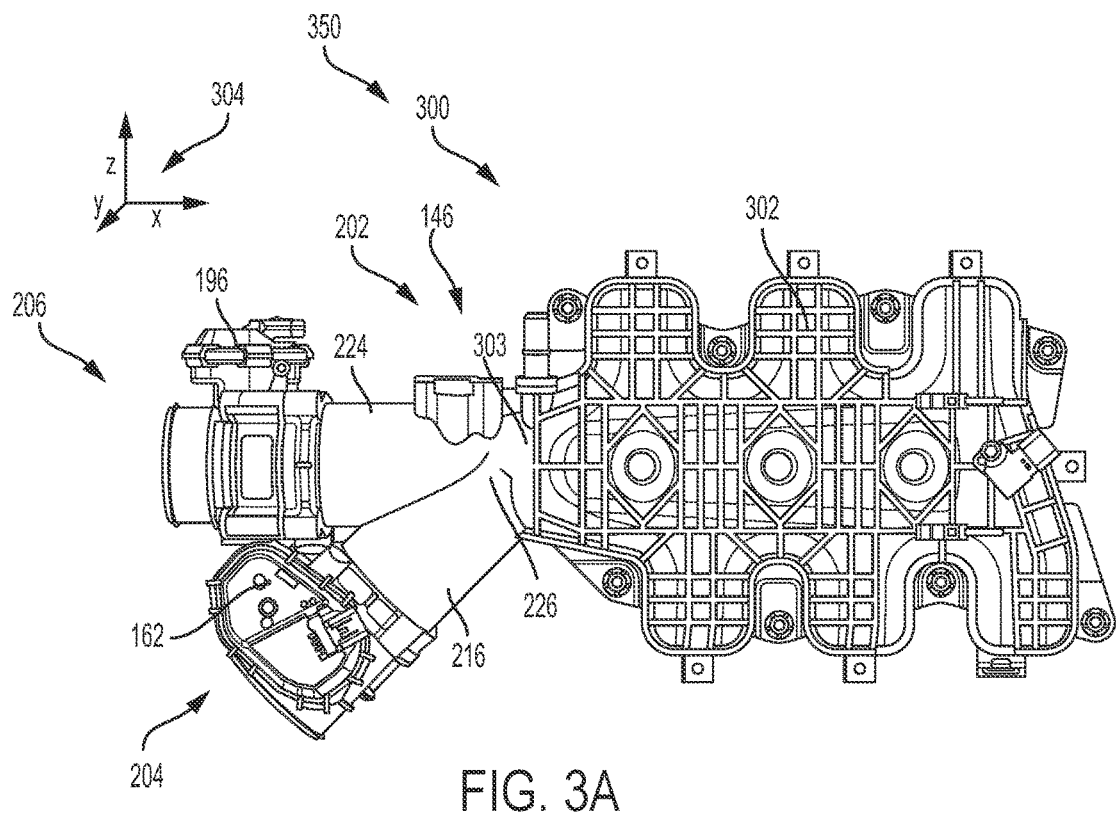
FIG. 3A shows a top view of a first embodiment of the pressurized air induction system.
Figure 3B:
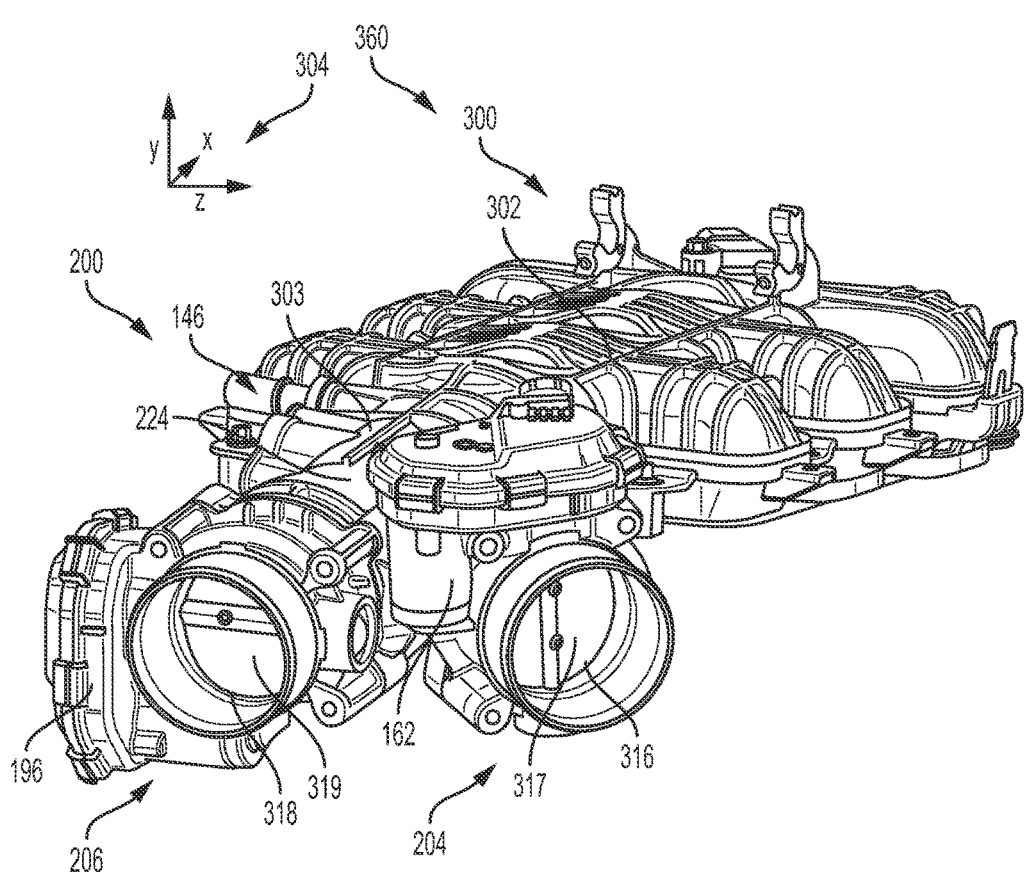
FIG. 3B shows an isometric perspective view of the first embodiment of the pressurized air induction system.
Figure 4B:
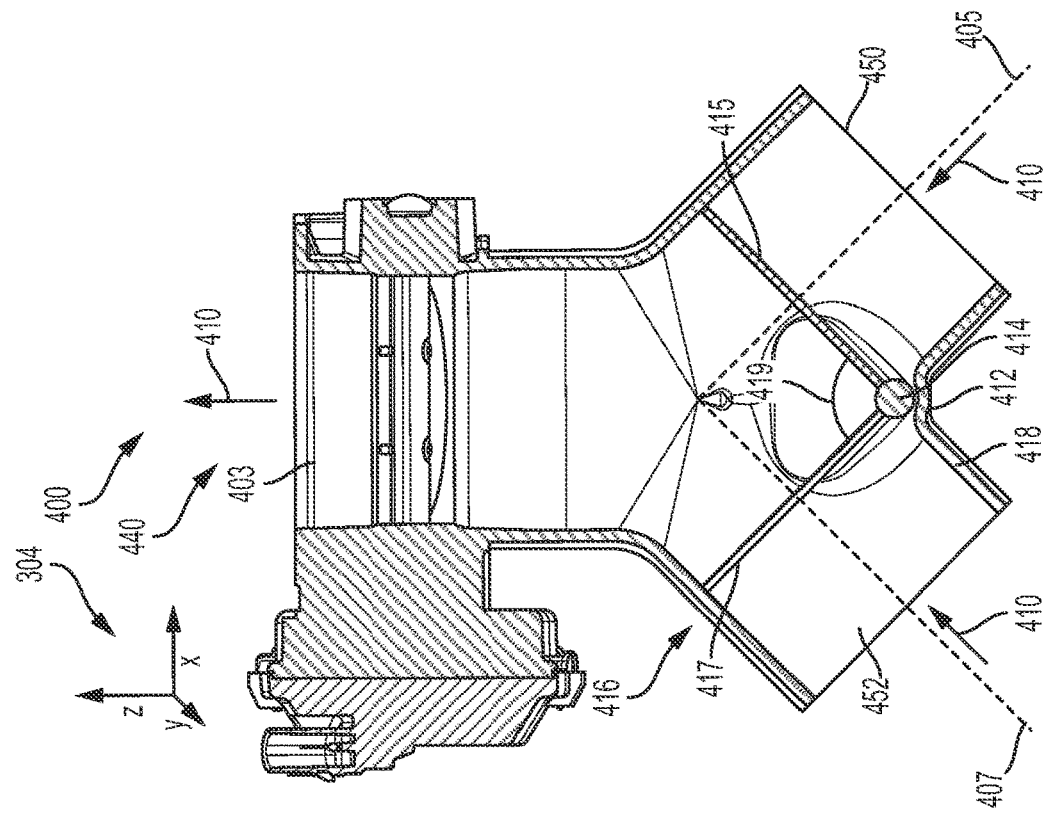
FIG. 4B shows a cross-sectional view of the second embodiment of the pressurized air induction system.
Figure 4A:
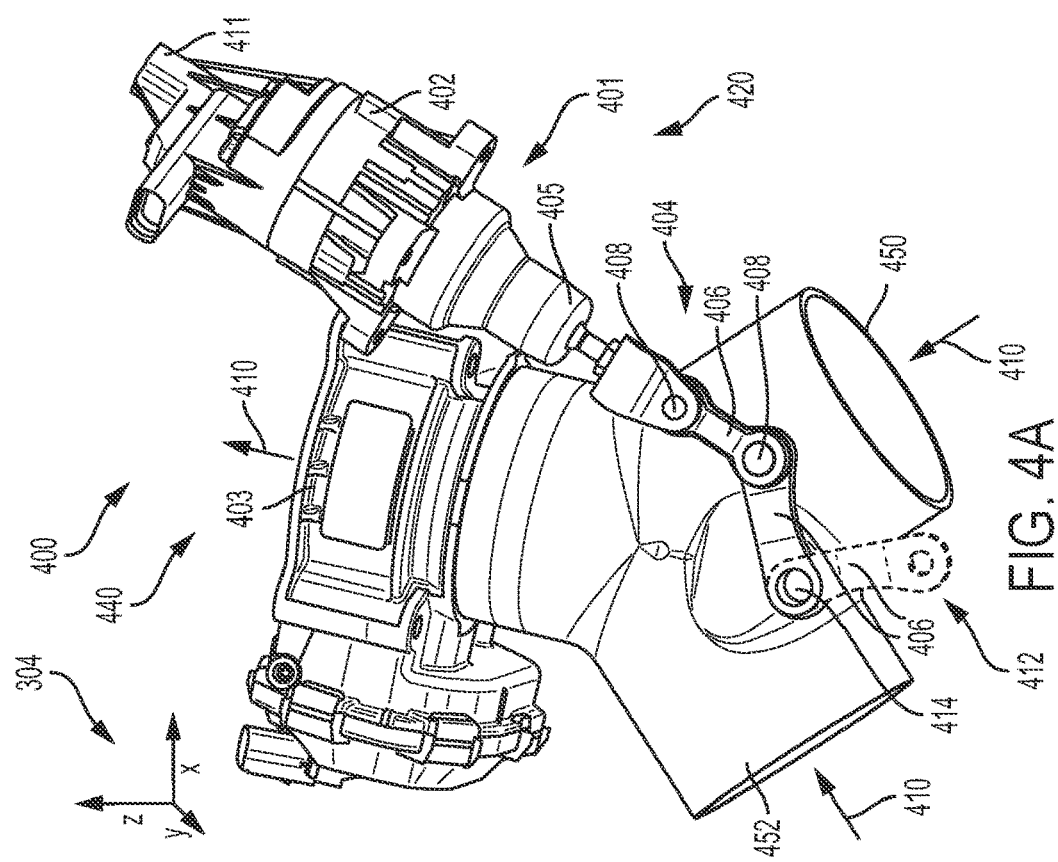
FIG. 4A shows a top view of a second embodiment of the pressurized air induction system.

The following description relates to systems and methods for providing cold, boosted air to an engine system, such as the system of FIG. 1, via a pressurized air induction system, such as the system of FIG. 2. The pressurized air induction system may include a first and a second air pathway for air flow, each pathway coupled at a first end to a fresh air duct and coupled at a second end to an intake plenum upstream of an engine cylinder. As shown in FIG. 2, the first air pathway may flow fresh ambient air to the engine while the second air pathway may flow air via a compressor and a charge air cooler (CAC). Flow through the first and second pathways may be controlled via individual throttle valves, as shown in the embodiment of FIGS. 3A-3B. Alternatively, the relative flow between the passages may be controlled via a splitter valve, as shown in the embodiment of FIGS. 4A-4B. A controller may be configured to perform a control routine, such as the example routine of FIG. 5, to adjust a position of the valve(s) based on engine speed-load conditions so that an amount of cool, compressed air can be stored in the second passage acting as a reservoir, the compressed air released responsive to an increase in torque demand to reduce turbo lag. The controller may also adjust the valve(s) to discharge any trapped air based on an inferred amount of heat transferred into the air. Example operations of the pressurized air induction system are illustrated herein with reference to FIGS. 6-7. In this way, boosted engine performance is improved.

FIG. 1 depicts an example of a cylinder of internal combustion engine 10 of a vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Engine 10 is a boosted engine comprising a turbocharger 175 for providing a boosted intake air charge. Although engine 10 is shown coupled to one turbocharger, other embodiments of engine 10 may include more than one turbocharger to provide boost. Turbocharger 175 is configured with a compressor 174 and an exhaust turbine 176. The compressor 174 is arranged in an air intake passage 142, which draws fresh ambient air into the engine 10. The compressor 174 is driven by the exhaust turbine 176. Since the compression of air heats the air charge, the boosted air is flowed through a charge air cooler (CAC) 192 where it is cooled before being delivered to engine cylinders. CAC 192 may be a water-air or air-air based heat exchanger. The turbine 176 is positioned in an exhaust passage 148 downstream of the cylinder 14 and upstream of an emission control device 178. Turbine 176 is connected to compressor 174 mechanically by a shaft 180. The rotation of turbine 176 is driven by hot expanding exhaust gas flowing from cylinder 14 through exhaust passage 148 towards emission control device 178, the spinning of turbine 176 at least partially powering the rotation of the compressor via the shaft 180. Engine 10 further includes a pressurized air induction (PAI) system 199 configured to deliver air to cylinder 14. The PAI system 199 includes a bypass duct 194 coupled at a first end to air intake passage 142 at a location upstream of compressor 174 and at a second end to an intake plenum 146. In this way, bypass duct 194 may constitute a first air pathway of the PAI system 199 while air intake passage 142 leading into air intake passage 198 including compressor 174 and CAC 192 constitutes a second air pathway of the PAI system 199. The configuration of the PAI system 199 is elaborated in detail at FIG. 2. Example embodiments of the PAI system 199 are detailed at FIGS. 3A-3B and FIGS. 4A-4B.

Cylinder 14 can receive intake air via air intake passages 142, 198, 144, and bypass duct 194 and the intake plenum 146, of which a general representation is shown in FIG. 1. Intake plenum 146 can communicate with other cylinders of engine 10 in addition to cylinder 14. FIG. 1 shows engine 10 configured with the turbocharger 175 including compressor 174 arranged between intake passages 142 and 198 and turbine 176 arranged along exhaust passage 148. Air intake passage 142 and bypass duct 194 flow air at ambient conditions while air intake passages 198 and 144 contain air that is boosted briefly by compressor 174. The CAC 192 may be disposed downstream of compressor 174 and upstream of a first throttle 162 in air intake passage 198 with a pressure relief valve (PRV) 164 positioned in between compressor 174 and CAC 192. The first throttle 162, which is also an air throttle, and a second throttle 196, which is also a boost throttle, may be provided along bypass duct 194 and intake passages 144, respectively, of the engine for varying the flow rate and/or pressure of intake air provided to the engine cylinders. For example, first throttle 162 may be positioned downstream of a CAC 192 as shown in FIG. 1, or alternatively may be provided upstream of CAC 192.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 193 for initiating combustion. Ignition system 190 can provide an ignition spark to cylinder 14 via spark plug 193 in response to spark advance signal SA from controller 12, under select operating modes. However, in some embodiments, spark plug 193 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 193. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake plenum 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

As described above, a vehicle may be adapted with a pressurized air induction (PAI) system coupled to an engine to improve performance during operations demanding increased torque. A pressurized air induction (PAI) system 200 is shown in FIG. 2 that may be coupled to an engine intake manifold 202. Elements that are common to elements of FIG. 1 are similarly numbered. The engine intake manifold 202 may direct air flow to a plurality of cylinders, such as cylinder 14 of FIG. 1, in which air may be mixed with fuel for combustion. The PAI system includes a first pathway 204 for delivering ambient air and a second pathway 206 for delivering compressed, cooled air to intake manifold 202. A direction of air flow through both the first pathway 204 and second pathway 206 of the PAI system is indicated by arrows 210. Air may be received in the PAI system 200 via an intake passage 142, which may in one example be the air intake passage 142 of FIG. 1. Air may then flow into the first pathway 204 and/or continue along intake passage 142 into the second pathway 206.

The first pathway 204 of PAI system 200 is coupled to the intake passage 142 via a coupling, shown in this example as a T-body 212. Other couplings, however, may be similarly used. The T-body 212 has a first junction 214 from which a bypass duct 216 of the first pathway 204 extends. In one example, bypass duct 216 may be the bypass duct 194 of FIG. 1. The bypass duct 216 diverts air drawn from intake passage 142 to intake plenum 146 while bypassing a compressor. As a result of the bypass duct, the first pathway 204 has a shorter length relative to the second pathway 206, enabling air at ambient pressure to be rapidly delivered to the engine intake manifold 202 when required by increasing an opening of the first pathway 204. Thus first pathway 204 acts as a shortcut for supplying ambient air to the engine intake manifold 202 during low engine loads and speeds where little or no boost is desired, e.g., following a tip-out. By supplying ambient air to the engine intake manifold 202 that is not cooled prior to delivery, condensation within the first pathway 204 may be avoided.

The first pathway 204 may also include the first throttle 162 positioned at a downstream end of the bypass duct 216 that is distal relative to the T-body 212 and proximal to the intake plenum 146 of the engine intake manifold 202. In one example, the first throttle 162 may control flow through the first pathway 204 to the engine intake manifold 202 based on signals received from controller 12. Controller 12 may command a degree of opening to first throttle 162 based on input indicative of torque demand, such as based on input from an accelerator pedal. Based on the degree of opening of first throttle 162, an amount of air flowing through intake passage 142 may be drawn through the first junction 214 of the T-body into bypass duct 216, and then delivered to engine intake manifold 202 upon passage through first throttle 162. As such, the air diverted into the first pathway 204 bypasses components included in the second pathway 206 that boost and cool the air contained therein.

The second pathway 206 is coupled to air intake passage 142 downstream of T-body 212 via second junction 220. The second junction 220 may be arranged perpendicular to the first junction 214. In one example, the coupling of the second pathway 206 to the first pathway 204 via the T-body may give PAI system 200 a Y-shaped structure. Specifically, by incorporating a T-body into intake passage 142 to couple the bypass duct 216 to the intake passage, the PAI system 200 may have a Y-shape in the region comprising intake passage 142, T-body 212, and bypass duct 216.

Air flowing into the PAI system 200 may flow through second junction 220 of the T-body 212 before entering second pathway 206. Second pathway 206 is a boosted air pathway including compressor 174 and CAC 192. In one example, compressor 174 is coupled in the turbocharger 175 and is driven via exhaust turbine 176.

Intake passage 142 extends into second pathway 206 downstream of the second junction 220 of the T-body 212 and is coupled to intake plenum 146 downstream of compressor 174 and CAC 192. Second pathway 206 also includes the second throttle 196 positioned at a downstream end of second pathway 206 that is proximal to the intake plenum 146. The second throttle 196 may be actuated in a similar manner to the first throttle 162 via instructions from the controller 12 in response to an input device, such as the accelerator pedal. Delivery of air from the second pathway 206 to the engine intake manifold 202 may be controlled by actuation of the second throttle 196 between a fully open and a fully closed position (to any position there-between). For example, when there is an increase in torque demand and the engine is operated at a mid-high speed-load region, the compressor 174 may be operated and the second throttle 196 may be opened to deliver the boosted air.

Second pathway 206 includes a first branch 222 defining a region of second pathway 206 from downstream of junction 220 to an inlet of CAC 192, and a second branch 224 defining a region of second pathway 206 from an outlet of CAC 192 to a location where the second pathway is coupled to intake plenum 146. Air flows through the second pathway 206 in a downstream direction from second junction 220 of T-body 212 to compressor 174, then through the PRV 164 before flowing into CAC 192. Air compressed via the compressor 174 is then cooled upon passage through CAC 192. Cooled compressed air then flows from CAC 192 into intake plenum 146 via second throttle 196.

Air flowing through intake passage 142 may first undergo compression by compressor 174, hereafter referred to as boosted air, and subsequently pass through PRV 164. PRV 164 may be a one-way valve that ensures that the boost pressure is contained on a downstream side of PRV 164, so that reverse flow of boosted air through the second pathway 206 does not occur. PRV 164 remains closed until a pressure threshold is exceeded. For example, the pressure threshold may be a non-zero pre-set value based on a safety rating of pressure allowance of the walls of the first branch 222 and second branch 224 or of fittings connecting the first branch 222 and second branch 224 to the CAC 192. In one example, the pressure threshold may be 14 Psi. When the boost pressure downstream of PRV 164 exceeds a threshold, PRV 164 may open to release the pressure. Continuing along the path of air flow in second pathway 206, air may flow through PRV 164 into first branch 222 and then flow through CAC 192. In one example, CAC 192 may be coupled to an engine cooling circuit that enables heat transfer from air, heated during compression, through surfaces of CAC 192 to a coolant. The heat exchange occurring at the CAC 192 both cools the air and increases the density of the air flowing through CAC 192 that is eventually delivered to the engine intake manifold 202, thereby improving the intake throttle response of the boosted engine. The flow of coolant through the CAC 192 may be varied based on boosted engine operating conditions. For example, flow of coolant through CAC 192 may be enabled when the engine is operating boosted, such as when compressor 174 is operated and second throttle 196 is at least partially open. As another example, flow of coolant through CAC 192 is disabled when the engine is operating without boost, such as when compressor 174 is not operated and second throttle 196 is held closed. By limiting operation of the CAC 192 to conditions when the engine is operating boosted, the engine's fuel economy may be improved by minimizing wasteful operation of the CAC 192. In addition, component life of the CAC 192 is increased.

Upon exiting CAC 192, the cooled, boosted air enters the second branch 224 of second pathway 206, and flows through second throttle 196. The second throttle 196 controls the delivery of cooled, boosted air from the second pathway 206 into the intake plenum 146. The intake plenum 146 then directs cooled, boosted air to the engine intake manifold 202 and thereon to the engine cylinders.

In addition to providing a pathway for boosted air when the second throttle is opened, the second pathway 206 may also function as a reservoir of boosted air when the second throttle 196 is closed. For example, responsive to a tip-out following boosted engine operation, the second throttle 196 may be closed to retain compressed air within second pathway 206 such as within at least the second branch 224 of the second pathway 206. In this way, when the second throttle 196 is closed, the second pathway 206 may act as an air induction reservoir. During light engine loads when boosted air is not required, the first throttle 162 is opened and the second throttle 196 is closed, enabling boosted air to be stored within PAI system 200. During a subsequent tip-in, the stored boosted air may be quickly delivered to the intake plenum 146 and then to the engine intake manifold 202 via the opening of second throttle 196, while the compressor 174 is spooled up. In this way, the release of the stored air from the second pathway 206 reduces turbo lag.

As such, the boost supporting potential of the stored boosted air may be affected by its temperature. Specifically, the release of cool compressed air, stored in the second pathway 206 during a tip-out, and released from the second pathway 206 during a subsequent tip-in, may reduce turbo lag as long as the compressed air is sufficiently cool. However, when the second pathway 206 is in a passive state while holding a reservoir of boosted air and with cooling operation of the CAC 192 disabled, heat may be transferred to the stored air. The amount of heat transferred may be determined as a function of ambient conditions. For example, as the ambient temperature rises, and/or the ambient humidity rises, the amount of heat transferred from the ambient air surrounding the PAI system 200 to the cool compressed air retained in the second pathway 206 may increase. Warming of the boosted air may reduce the density of the air, reducing the throttle response of the boosted air when it is released, and thereby lowering the amount of boost that it can provide. Accordingly, the PAI system 200 may be adapted to vent the stored boosted air from the second pathway 206 when a temperature or time threshold is exceeded, independent of the torque demand.

For example, while the second throttle 196 is closed, the controller may estimate or infer the amount of heat being transferred to the stored air. In one example, the output of an intake air humidity sensor 230 and an intake air temperature (IAT) sensor 232 arranged along intake passage 142, upstream of the T-body 212 may be used to estimate ambient humidity and ambient temperature, respectively, when the second throttle 196 is closed. Based on the measured ambient conditions, the controller may calculate an amount of heat transferred to the stored boosted air, a rate of rise in temperature, and an inferred boosted air temperature. The inferred boosted air temperature may be additionally or optionally determined as a function of the boosted air temperature at the time the second throttle 196 was closed, as well as a duration elapsed since the second throttle 196 was closed. In one example, the controller may use a model or algorithm to infer the temperature of the boosted air retained in the second pathway 206, in real-time. If the inferred temperature of the stored air exceeds a threshold before a subsequent tip-in event is confirmed, the controller may actuate the second throttle 196 to at least a partially open position to discharge the stored air to the engine while still at low engine speeds or loads. In one example, the second throttle 196 may be transiently shifted to a fully open position to release the stored air, and then returned to the closed position. An opening of the first throttle 162 may be adjusted based on the transient opening of the second throttle 196, as elaborated at the method of FIG. 5. In addition, one or more engine operating parameters, such as spark timing, may be adjusted to reduce torque transients associated with the release of the warm compressed air into the engine intake manifold 202.

In the depicted example, each of first throttle 162 and second throttle 196 may be equipped with an actuating mechanism that receives separate signals from the controller 12. This allows the two throttles to be operated independently. A detailed embodiment of a PAI system 200 with distinct throttles is shown with reference to FIGS. 3A-3B. Alternatively, a single actuating mechanism may control the opening and closing of both the first throttle 162 and second throttle 196, in concert. In yet another embodiment, as detailed with reference to FIGS. 4A-4B, air flow to the engine from the first pathway 204 and second pathway 206 may be controlled by a single splitter valve arranged in the intake plenum 146 in a merging region 226 of the bypass duct 216 and second branch 224 of the second pathway 206. In this arrangement, air delivered via the first pathway and/or the second pathway is simultaneously controlled by a single valve with dimensions optimized for the geometry at the merging region 226 of the intake plenum 146. Embodiments illustrating the use of the throttles (FIGS. 3A-3B) and the splitter valve (FIGS. 4A-4B) for directing air flow to the engine are further described in detail below.

A first embodiment 300 of a PAI system, such as of PAI system 200 of FIG. 2, is illustrated at FIGS. 3A-3B. A set of reference axes 304 is provided for comparison between views, indicating a "z" lateral direction, "x" horizontal direction, and "y" vertical direction. FIG. 3A depicts a top view 350 of the first embodiment 300 of PAI system 200. The first and second pathways, with reference to the first and second pathways 204 and 206 of FIG. 2, are cut-off upstream of the first throttle 162 along line A-A' and upstream of the second throttle 196 along line B-B' to provide the view shown in FIG. 3A. The first throttle 162 couples to a downstream end of the bypass duct 216 of the first pathway 204 and the second throttle 196 couples a downstream end of the second branch 224 of the second pathway 206, with reference to FIG. 2. The bypass duct 216 and second branch 224 merge in the intake plenum 146 at the merging region 226. The intake plenum 146 is connected to an intake manifold 302 of a vehicle, such as vehicle 5 of FIG. 1.

The bypass duct 216 and second branch 224 merge so that the merging region 226 is Y-shaped. Air flowing into the intake manifold 302 from either the first bypass duct 216 or second branch 224, or simultaneously from both, is directed into a merged channel 303, e.g. the stem of the Y-shape, of the intake plenum 146 before entering the engine intake manifold 302. When ambient air enters the intake plenum 146 from bypass duct 216 and boosted air enters via the second branch 224, the two types of air are mixed within the merged channel 303 of the intake plenum 146 before flowing to the engine intake manifold 302. In this way, the air entering the engine intake manifold 302 may have a temperature and pressure determined by the proportional mixing of the warmer, ambient air and the cooler, boosted air.

A view 360, taken from a direction along the second branch 224 of the second pathway 206, of the first and second throttles 162 and 196 depicted in FIG. 3B shows that the first throttle 162 and second throttle 196 may block the flow of air by extending a first sealing wall 317 entirely across a first opening 316 in the first throttle 162. Similarly, flow through the second throttle 196 may be blocked by extending a second sealing wall 319 entirely across a second opening 318. The first sealing wall 317 and second sealing wall 319 may be adjustable so that the first opening 316 and second opening 318, respectively, may be partially open. For example, the first sealing wall 317 may extend a portion across the first opening 316 in the first throttle 162, and similarly the second sealing wall 319 may extend a portion across the second opening 318 of the second throttle 196 where the portion may include 1-99% of the area of the first and second openings 316 and 318. In other words, the first opening 316 of first throttle 162 and the second opening 318 of second throttle 196 may be reduced from fully open positions so that the first sealing wall 317 does not extend entirely across the first opening 316, and the second sealing wall 319 does not extend entirely across the second opening 318.

Based on engine speed and operation, a signal may be sent to each of first throttle 162 and second throttle 196 from a controller to adjust the first opening 316 and second opening 318, respectively. During low engine speeds and operating loads, the first throttle 162 is actuated to an open position, e.g., fully open, while the second throttle 196 is concurrently actuated to a closed position, e.g., fully closed, so that fresh air may be delivered via the first pathway 204. Conversely, during high engine speeds and heavy operating loads, the first throttle 162 may be fully closed and the second throttle 196 fully opened so that cooled, boosted air may be delivered exclusively via the second pathway 206. Furthermore, detection of a tip-out may result in either a fully open or partially open position of the first throttle 162 while the second throttle is fully closed. Subsequent to the tip-out and independent of torque demand, if a time or temperature threshold calculated for the stored boosted air is surpassed, the reservoir of boosted air is discharged. Therein, the first throttle 162 may receive a signal to fully close or reduce the first opening 316 as the second throttle 196 is simultaneously actuated to at least a partially open position. Air from both the first pathway 204 and second pathway 206 are thus delivered to the merged channel 303 of the intake plenum 146 and mixed therein before flowing to the engine intake manifold 302.

As discussed above, the air flow in the PAI system may be controlled by either a pair of throttles, one disposed in each of the first and second pathways, or by a splitter valve. A second embodiment of a PAI system 400 is illustrated in FIGS. 4A-4B. Only an intake plenum 440 is depicted, which may be an embodiment of intake plenum 146 of FIG. 1, showing the coupling of a splitter valve 401 to the intake plenum 440. The intake plenum 440 has a first duct 450 that may couple to a first pathway of the PAI system 400 that flows ambient air and a second duct 452 that may couple to a second pathway that delivers cooled boosted air. Air may enter each the of the first duct 450 and the second duct 452 in the directions indicated by arrows 410 and exit from the intake plenum 440 through a single channel 403 into which the first duct 450 and second duct 452 merge. The single channel 403 may direct air flow into an engine intake manifold, such as engine intake manifold 202 of FIG. 2.

The intake plenum 440 is viewed from above in FIG. 4A while a cross-section of the intake plenum 440, taken along the plane formed by the "z" lateral direction and "x" horizontal direction, is shown in FIG. 4B. In the embodiment of FIGS. 4A-4B, the first throttle 162 and second throttle 196 of FIGS. 3A-3B are replaced by a single splitter valve 401. The splitter valve 401 may provide a single mechanism for adjusting the flow through each of the first and second pathway of the PAI system 400, in contrast to the separate mechanisms and control of the example PAI system 200 shown in FIGS. 3A-3B.

The splitter valve 401 splits flow between the first ducts 450 and second duct 452 of the intake plenum 440, thus acting as a single proportioning valve instead of two separate adjustable bodies, e.g. the first and second throttles 162 and 196 of FIGS. 3A-3B. Based on a position of the valve, the splitter valve 401 may enable flow through the first duct 450 exclusively, the second duct 452 exclusively, or from a combination of both the first and second duct 450 and 452. The amount of flow from each of the first and second ducts 450 and 452 relative to one another may be controlled by an actuator 402 of the splitter valve 401 based on a command signal received from an engine controller.

An outer portion 420 of the splitter valve 401 (e.g., the portion that is positioned outside of the intake plenum 440), may include an actuator 402 that is in electronic communication with the controller, such as controller 12 of FIG. 1, and an arm 404. The actuator 402 may be arranged adjacent to a single channel 403 into which the first duct 450 and second duct 452 merge. At a first end 409 of the actuator 402 that is upstream of a second end 411, the actuator 402 is connected to the arm 404. The actuator 402 receives signals that may be translated into movement of the arm 404.

The arm 404 extends across the second duct 452, in a direction perpendicular to air flow, as indicated by arrows 410, and may be fixed to a wall of the intake plenum 440 in a saddle 412, where the first duct 450 and second duct 452 meet, via a pin 414. The pin 414 extends through a wall 418 of the intake plenum 440. The arm 404 comprises a plurality of sections 406 connected by hinges 408 around which the plurality of sections 406 may be pivoted. The pivoting of the plurality of sections 406 of the arm 404 may rotate a V-shaped splitter 416 arranged inside the intake plenum 440, as shown in FIG. 4B.

The V-shaped splitter 416 has a first flap 415 positioned inside the first duct 450 which has a first central axis 405 and a second flap 417 positioned inside the second duct 452 which has a second central axis 407. The first central axis 405 is arranged perpendicular to the second central axis 407. The first flap 415 and second flap 417 may be connected to one another at a fulcrum defined by the position of the pin 414. The pin 414, extending through the wall 418, may connect to the V-shaped splitter 416 at the fulcrum inside the intake plenum 146, securing valve 416 to the saddle 412 at the fulcrum of the V-shape. Rotation of the pin 414 by the arm 404 may also rotate the V-shaped splitter 416.

The first flap 415 and second flap 417 may be at a fixed angle 419 relative to one another. The fixed angle 419 may be greater than 90 degrees or less than 90 degrees, but not 90 degrees in order to allow greater flow through of the first duct 450 than the second duct 452 or greater flow through the second duct 452 than the first duct 450 to the engine intake manifold by pivoting the V-shaped splitter 416 via the pin 414. When either the first flap 415 or the second flap 417 is arranged 90 degrees within the first duct 450 and second duct 452, respectively, the duct is sealed.

As an example, during conditions when more flow through the first duct 450 than the second duct 452 is desired, such as at low loads, the V-shaped splitter 416 may pivot so that the second flap 417 is slightly more or less than perpendicular to the second central axis 407. A smaller opening in the second duct 452 due to the near perpendicular positioning of the second flap 417 (in comparison to the first flap 415 which deviates further from perpendicular), allows more air flow through the first duct 450 than the second duct 452. In another example, if only flow through the first duct 450 is desired, adjusting the V-shaped splitter 416 so that the second flap 417 is perpendicular to the second central axis 407 may entirely close the second duct 452 while allowing the first flap 415 to remain open, thereby enabling exclusive flow through the first duct 450. To enable more flow through the second duct 452 than the first duct 450 during higher engine loads and speeds, the V-shaped splitter 416 may pivot so that the first flap is slightly more or less than perpendicular to the first central axis 405. This results in a larger opening in the second duct 452 than the first duct 450. For exclusive flow from the second duct 452, the V-shaped splitter 416 may be adjusted so that the first flap 415 is perpendicular to the first central axis 405. The first duct 450 is thus closed and air is delivered to the intake plenum 440 through the second duct 452.

Figure 5:
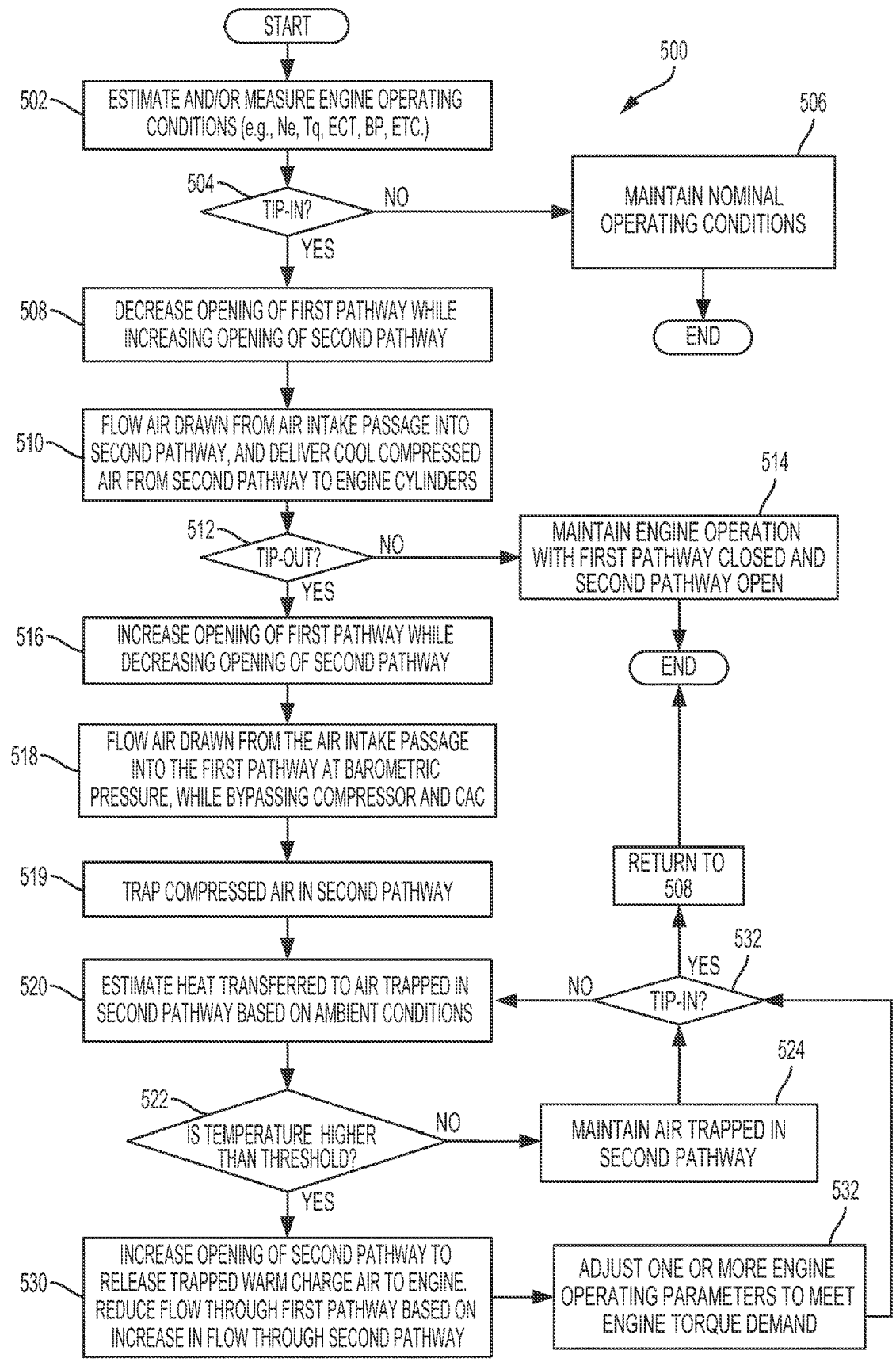
FIG. 5 depicts a high level flow chart of an example method for controlling the operation of a pressurized air induction system.

Now turning to FIG. 5, example routines 500 for supplying either ambient air or cool, boosted air to an engine is described. Boosted air may be discharged from a reservoir of a PAI system in response to an increase in torque demand and engine operation in a higher engine speed-load region (such as following an operator pedal tip-in event) requesting additional engine torque and/or a tip-out (e.g. pedal released). By adjusting the air flow from a first pathway and/or a second pathway of the PAI system, cooled, boosted air may be stored in the PAI system and supplied to the engine as desired. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 502, the operating conditions of the engine may be estimated and/or measured. These may include, for example, engine speed and load, torque demand, engine coolant temperature, barometric pressure, ambient humidity, ambient temperature, MAP, MAF, etc. At 504, it may be determined if there is an increase in operator torque demand. For example, it may be determined whether an accelerator pedal tip-in is detected. In one example, accelerator pedal depression may be measured via a pedal position sensor. If no tip-in is detected, at 506, the method includes operating at nominal settings based on the estimated engine parameters.

In one example, where the engine is operating at low-mid speed-loads, operating at nominal conditions includes supplying fresh air to engine cylinders at ambient temperature, pressure, and humidity via the first pathway of the PAI system while maintaining the second pathway, that includes a compressor and a CAC, closed. This includes opening the first pathway by actuating a first throttle disposed in the first pathway proximal to an intake plenum coupled to an engine intake manifold to either a fully open position or partially open position. Partially opening the first throttle may comprise adjusting an opening of the first throttle to be a percentage of the opening when fully open. For example the opening of the partially open first throttle may be 20%, 50%, 70% or a percentage between 1%-99% relative to the opening of the first throttle when the first throttle is fully open.

If a tip-in is detected, the method proceeds to 508 where the controller may send a signal to decrease flow through the first pathway and increase flow through the second pathway of the PAI system so that a larger portion of the air delivered to the engine intake is cooled, boosted air. The routine includes directing ambient air from an intake passage through the compressor of a turbocharger and then cooling the air through the CAC so that the air is cooled and compressed upon reaching the engine intake. In one example, where the PAI system has a first throttle coupled to a first pathway and a second throttle coupled to a second pathway, directing a larger portion of air to the engine as boosted air includes opening the second throttle and closing the first throttle. The degree of opening of the second throttle is based on an amount of torque requested, as inferred from the pedal position. The more the pedal is depressed, the greater the torque demanded, resulting in a higher degree of opening of the second throttle. The second throttle may open by a smaller amount when the pedal is slightly depressed or fully open when the pedal is depressed to a maximum. Concurrent with the opening of the second valve, the first valve opening is decreased as input from the pedal indicates increase in demand for boosted air. The first valve opening may decrease by a proportional degree to the amount the second valve is opened or the first valve may be fully closed to avoid potential change in pressure and/or temperature of the boosted air due to mixing with ambient air.

In another example, where the PAI system has a splitter valve disposed in a region where the first pathway and second pathway merge with a first flap arranged in the first pathway and a second flap arranged in the second pathway, operating at nominal conditions at 506, as described above, includes adjusting the splitter valve so that the second flap is perpendicular to the path of flow in the second pathway. The second pathway is thus closed and the first pathway is open, delivering ambient air to the engine via the first pathway of the PAI system.

In the event of a tip-in, the method at 508 directs a larger portion of air to the engine as boosted air. The splitter valve may be tilted so that the second flap forms an opening in the second pathway that is larger than an opening formed by the first flap in the first pathway. The angling of the splitter valve is based on an amount of torque requested, e.g. sensing of pedal position. The more the pedal is depressed, the greater the torque demanded, resulting in adjustment of the splitter valve so that the first flap is closer to perpendicular in the first pathway than the second valve. The closer the first flap is to perpendicular, the smaller the opening in the first pathway relative to the opening in the second pathway. If a small depression in pedal position is detected, the splitter valve may tilt so that the first flap is slightly closer to perpendicular within the first pathway than the second flap within the second pathway. As a result, a smaller opening is formed in the first pathway than the second pathway. If the pedal is depressed to a maximum position, the first flap may be positioned exactly perpendicular so that the first pathway is blocked and air delivered to the engine is entirely boosted air from the second pathway.

At 510, air is drawn through the second pathway from an intake passage, such as intake passage 142 of FIG. 2, pressurized by the compressor and then cooled upon passing through the CAC. At 512 the method may determine if a tip-out is detected, e.g., if the accelerator pedal is released as inferred by the pedal position sensor. If the tip out is not detected, engine operation continues to 514 with the second pathway open and the first pathway while torque demand remains elevated. If a tip-out is detected, the method proceeds to 516 where the controller may send a signal to increase flow through the first pathway and decrease flow through the second pathway of the PAI system so that a larger portion of the air delivered to the engine intake is ambient air.

In one example, where the PAI system has a first throttle coupled to a first pathway and a second throttle coupled to a second pathway, directing a larger portion of air to the engine as ambient air includes opening the first throttle and closing the second throttle. The degree of opening of the first throttle and closing of the second throttle is based on the torque demand. The more the pedal is released, e.g. less depressed, the lower the torque demand resulting in the further reduction of the opening of the second throttle. The lower torque demand, as inferred by pedal position, and the consequent decrease in the opening of the second throttle results in an increase in the opening of the first throttle. When the pedal is fully released, the first throttle may be fully opened while the second throttle is fully closed.

In another example, where the PAI system has a splitter valve disposed in a region where the first pathway and second pathway merge with a first flap arranged in the first pathway and a second flap arranged in the second pathway. At 516, the splitter valve may be tilted so that the first flap forms an opening in the first pathway that is larger than an opening formed by the second flap in the second pathway. The angling of the splitter valve is based the decrease in torque demand, inferred by the pedal position. The less the pedal is depressed, the lower the torque demanded, resulting in adjustment of the splitter valve so that the second flap is closer to perpendicular in the second pathway than the first valve. The closer the second flap is to perpendicular, the smaller the opening in the second pathway relative to the opening in the first pathway. If the pedal is released, for example, to a half-way depressed position, the splitter valve may tilt so that the second flap is slightly closer to perpendicular within the second pathway than the first flap within the first pathway. As a result, a smaller opening is formed in the second pathway than the first pathway. If the pedal fully released, the second flap may be positioned exactly perpendicular so that the second pathway is blocked and air delivered to the engine is entirely ambient air from the first pathway.

At 518, ambient air is flowed at barometric pressure to the engine intake, bypassing the compressor and CAC. While ambient air is drawn into the engine, flow through the second pathway is blocked by closing the second throttle or second flap of the splitter valve. The air contained within the second pathway is trapped at 519 between a PRV, such as PRV 164 of FIG. 2, at an upstream end and the second throttle or second flap at a downstream end of the second pathway at 519. Within the closed second pathway, the air trapped upstream of the CAC may be pressurized and at ambient temperature while the air trapped downstream of the CAC may be pressurized and cooled. At 520, the state of the stored boosted air in the second pathway is estimated by inferring an amount of heat transferred to the stored air and calculating a rate of temperature rise.

For example, data from an intake humidity sensor and an IAT sensor, such as the sensors 230 and 232 of FIG. 2, may be sent to the controller to estimate the ambient humidity and ambient temperature of the trapped air. The data is used to calculate, based on information stored in the controller about conductivity of the material forming the walls of the second pathway and the temperature differential between ambient air and trapped boosted air, the amount of heat transfer from the surrounding air external to the second pathway into the trapped air. The heat transfer may be used to determine a temperature of the trapped air which is compared to a pre-set non-zero temperature threshold. The threshold may be a temperature at or above which the boost potential of the trapped air is reduced to an extent that the boosted performance of the engine may be degraded if the trapped air is discharged. In addition to the temperature threshold, a time threshold may be used to evaluate the boost potential of the stored air.

A rate of temperature rise, e.g., joules per second, of the trapped air may be inferred from the estimated heat transfer. The time threshold may be calculated based on a look-up table stored in a memory of the controller providing time thresholds as a function of ambient conditions and estimated rate of temperature rise. For example, low ambient temperatures or low ambient humidity may result in slower rates of temperature rise, a longer time threshold, and a longer period of time before the temperature of the trapped air reaches or exceeds the temperature threshold. Conversely, high ambient temperature or high ambient humidity may shorten the time threshold due to a faster expected rate of temperature rise. Both the pre-set temperature threshold as well as the time threshold may be used to evaluate the state of the trapped boosted air in the second pathway of the PAI system.

At 522 of method 500, the inferred temperature of the stored air and the duration since the second pathway was closed to trap the boosted air may be compared to the pre-set thresholds stored in the memory of the controller. If the estimated temperature is not above the temperature threshold or the duration of time does not exceed the calculated time threshold, air is maintained trapped within the second pathway. The method then determines if a tip-in is detected at 526. In the event that no tip-in is detected, the method returns to 520 and evaluates the state of the trapped air based on ambient temperature and humidity as described above, followed by comparison with pre-set thresholds at 522. Alternatively, if a tip-in is detected, the method returns to 508 where an opening of the first pathway is decreased and an opening of the second pathway is increased based on the pedal position detected and inferred demand for torque. Ambient air is delivered to the engine while flow of boosted air is minimized or blocked.

Returning to 522 of method 500, if the heat transfer exceeds the threshold, the method proceeds to 530. At 530, the second pathway is opened to allow the warmed boosted air to be discharged to the engine intake manifold. The release of warmed boosted air, however, in addition to the air delivered to the engine intake manifold via first pathway may result in boosting the engine above a desired level of torque. Consequently, the controller may send a signal to reduce the flow of ambient air from the first pathway.

In one example, where the PAI system has a first throttle coupled to a first pathway and a second throttle coupled to a second pathway, opening the second pathway to discharge the stored boosted air includes opening the second throttle and closing the first throttle. The degree of opening of the second throttle and closing of the first throttle is based on the amount of torque requested, as inferred from pedal position. For example, if the pedal is slightly depressed, the first throttle may be fully closed and the second throttle partially opened to prevent the engine from becoming overloaded. If the pedal is halfway depressed, the opening of first throttle may be reduced but still partially opened while the second throttle is partially opened to vent the stored air.

In another example, where the PAI system has a splitter valve disposed in a region where the first pathway and second pathway merge with a first flap arranged in the first pathway and a second flap arranged in the second pathway, opening the second pathway to discharge the stored boosted air includes tilting the splitter valve so that an opening in the second path formed by the second flap is increased while simultaneously reducing the opening in the first pathway formed by the first flap. The angling of the splitter valve is based on the amount of torque requested, as inferred from pedal position. For example, if the pedal is slightly depressed, the splitter valve may tilt so that the opening in the second pathway is smaller than the first pathway. If the pedal is halfway depressed, the splitter valve may be adjusted so that the openings in the first pathway and second pathway are approximately equal.

One or more engine actuators may be adjusted at 532 if decreasing the flow from the first pathway does not sufficiently compensate for the boost provided by the warmed boosted air. If a torque transient is expected, other engine operating parameters may also be varied. For example, spark timing may be retarded, fuel injection and valve timings may be modified, or the ratio of fuel delivered via direct injection versus port injection may be adjusted. By altering engine operations in response to excessive boost relative to engine load, misfiring at a plurality of cylinders of the engine may be avoided.

In one example, the degree to which spark timing is delayed is based on a difference between the amount of torque requested and an amount of torque supplied. Upon discharging warmed, boosted air to the engine through the second pathway with flow from the first pathway reduced, the boosted air may still provide boost pressure to the engine beyond the requested amount inferred by the pedal position. As a result, spark may be retarded from maximum brake torque (MBT) to avoid engine knock. For example the greater the discrepancy between the requested boost and the provided boost, where the provided boost is too high, the longer the spark timing may be delayed to allow the pressure in a combustion chamber of the engine to dissipate by an amount before ignition. In other words, the more the opening of the second pathway is increased during discharge of the warmed, stored air, the further the spark timing is retarded from MBT. When the supply of torque decreases to match the torque demand spark timing then returns MBT.

Following the adjustment of engine operating parameters, the method returns to 526 to determine if a tip-in is detected. If no tip-in is detected, the method returns to 520 and evaluates the state of the trapped air based on ambient temperature and humidity as described above, followed by comparison with pre-set thresholds at 522. Alternatively, if a tip-in is detected, the method returns to 508 where an opening of the first pathway is decreased and an opening of the second pathway is increased based on the pedal position detected and inferred demand for torque. Ambient air is delivered to the engine while flow of boosted air is minimized or blocked. Thus, subsequent to initial startup, boosted air may be readily supplied to the engine upon detection of a tip-in by discharging stored boosted air through the second pathway and decreasing flow through the first pathway. In the event of a tip-out, the second pathway is bypassed, providing a shortened delivery path of ambient air to the engine, thereby avoiding the unnecessary use of boosted air. During the tip-out, if the temperature of the stored air surpasses a temperature threshold or a period of time elapses that exceeds a time threshold that renders the stored air less effective for providing boost, the stored air is released.

Example operations of a PAI system, with reference to the PAI system of FIGS. 3A-3B are now discussed with reference to FIG. 6. FIG. 7 shows an example of a PAI system adapted with a splitter valve, as shown in FIGS. 4A-4B. Based on a request for engine torque and on heat exchange to the stored boosted air in the PAI system, air flow through a first pathway, supplying fresh air, and a second pathway, supplying boosted air, is adjusted.

Figure 6:
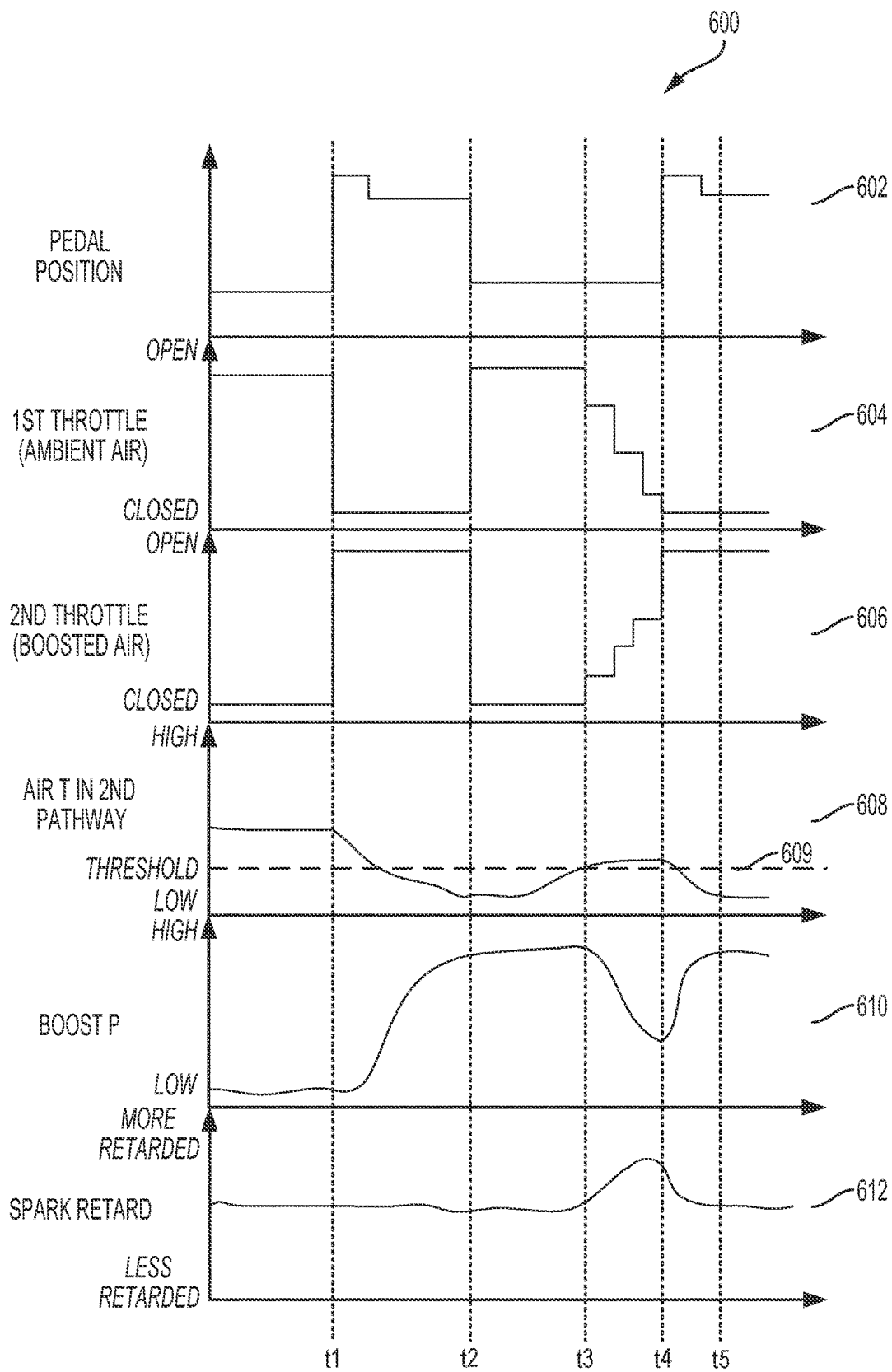
FIGS. 6-7 show example operations of the pressurized air induction reservoir system to improve boosted engine performance, according to the present disclosure.
Figure 7:
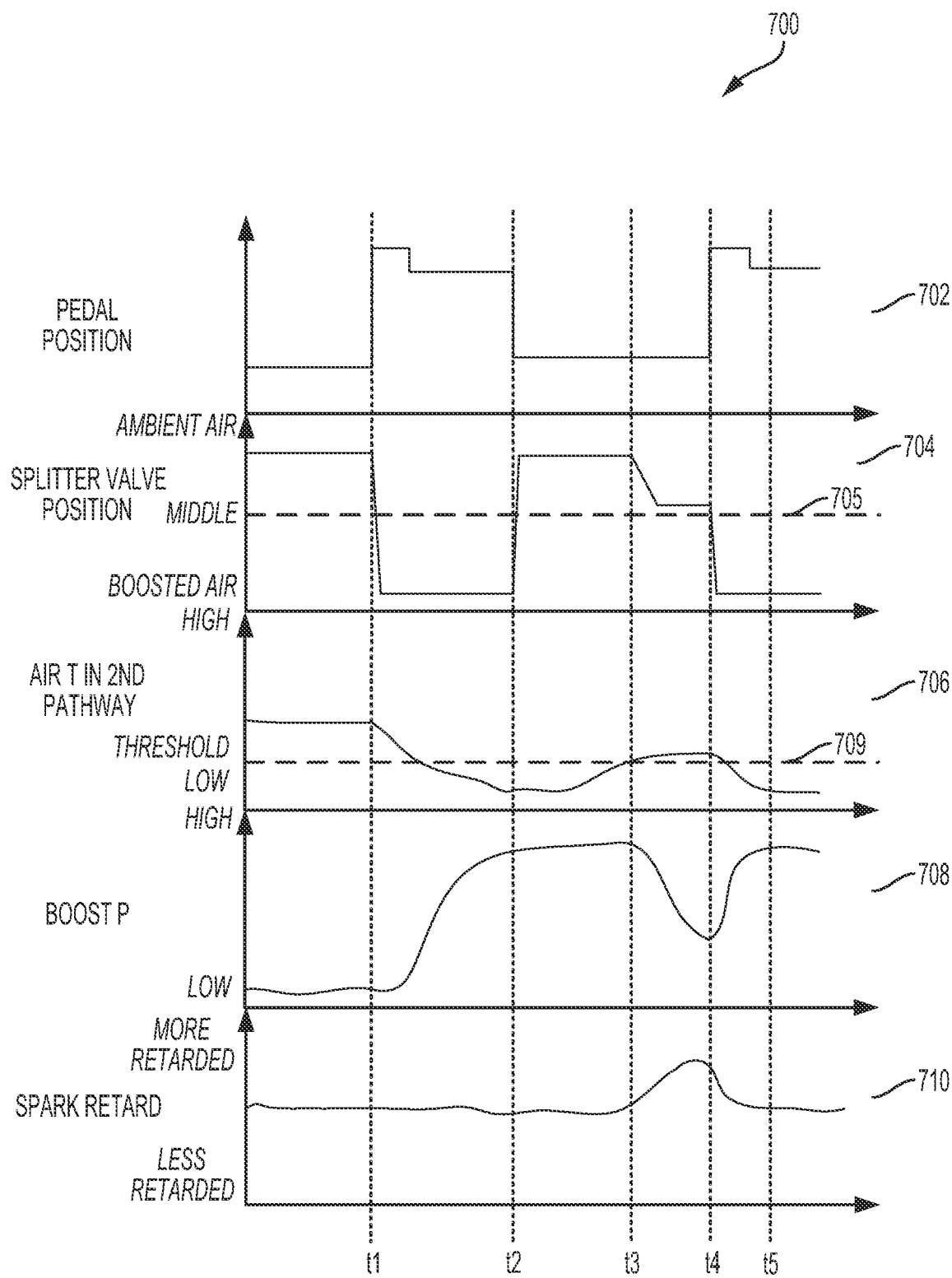

FIG. 6 shows an example operation of the PAI system adapted with a first throttle, controlling flow of fresh air, and a second throttle, controlling flow of boosted air. As elaborated in map 600, a tip-in or tip-out is detected by a pedal position, depicted in graph 602. The opening and closing of the first and second throttle is shown at graph 604 and graph 606, respectively. The temperature of the boosted air in the second pathway, is illustrated at graph 608 and the boost pressure of the air supplied to the engine intake is shown at graph 610. The spark timing is depicted in graph 612 as a function of the operating conditions shown.

Prior to t1 the engine is operating at low speed with the first throttle open, enabling the flow of fresh air through the first pathway to the engine. The second throttle is closed, blocking flow from the second pathway into the engine since boost air is not required, a CAC is not operating and the air temperature within the second pathway is close to ambient temperature and above a pre-set, non-zero temperature threshold 609. The boost pressure, as a result of the low torque demand, is also low and the spark timing is at or around MBT.

At t1, a tip-in is detected as indicated by a depression of an accelerator pedal. The tip-in activates the adjustment of the air flow to the engine: the first throttle is entirely closed and the second throttle is entirely open. As air flows through the second pathway, the air is continually cooled, resulting in a gradual decrease in the air temperature of the second pathway. The boost pressure in the second pathway increases to meet the request for increased torque while the spark timing remains at MBT.

A tip-out, detected by reduced depression of the pedal, occurs at t2. Responsive to the tip-out, the first throttle is opened and the second throttle is closed, alternating the air supply to the engine to flow fresh air instead of boosted air. As a result of the closing of the second throttle, boosted air is stored in the second pathway. Between t2 and t3, the stored air gradually warms due to heat transfer between ambient air surrounding the second pathway and the air stored within the second pathway. Boost pressure of the stored air remains relatively constant until t3 when the temperature of the second pathway exceeds the temperature threshold 609. The threshold may be a value above which the boost provided by the air is degraded. In addition, a time threshold may elapse by t3 that is based on a rate of temperature rise calculated from inferred heat transfer and determines when the temperature of the stored air exceeds the temperature threshold 609. Responsive to the detected surpassing of the temperature and time thresholds described above, a step-wise adjustment of the opening of the second throttle is performed. Opening of the second throttle increases air flow to the engine, causing an undesired increase in torque. Thus the first throttle is adjusted to be less open in association with the opening of the second throttle. The boosted air in the second pathway, however, is pressurized so that with each incremental opening of the second throttle, more air may flow out of the second pathway than an equal incremental closing of the first throttle. Thus, as shown in map 600 by graphs 604 and 606, each opening step of the second throttle is accompanied by a larger step of the first throttle to accommodate the different densities of fresh air versus boosted air. As an example, for every 5% opening of the second throttle the first throttle is closed by an estimated 15%.

The adjustment of the first and second throttle may not be able to fully compensate for the increase in air flow to the engine via the second pathway. As a result, a torque transient may occur with excess torque being produced. To address this, one or more engine operating parameters may be adjusted. For example, spark timing may be retarded from MBT. At t3, spark ignition timing is retarded further from MBT as the second throttle opening is increased. A concurrent decrease in boost pressure is observed as the boosted air is released from the second pathway to the engine while the air temperature in the second pathway remains relatively constant and above the temperature threshold 609.

At t4, a second tip-in is detected and the first throttle is closed as the second throttle is opened. As air flows through the compressor and CAC operation in the second pathway is enabled, the air is cooled and the temperature of the boosted air in the second pathway decreases below the threshold 609. The boost pressure at t4 is lower than the boost pressure following the first tip-in between t2 and t3 but higher than the initial period up to t1. The distance between the dashed line of t1 and dashed line of t2 indicate a time for boost pressure to increase from pre-tip-in pressure at t1 to maximum boost pressure at t2, or turbo lag. Similarly, the distance between the dashed line of t4 and dashed line of t5 indicates turbo lag before boost pressure increases to maximum boost pressure following the tip-in at t4. Turbo lag following the second tip-in at t4 is shorter than turbo lag following the first tip-in at t1. This shows a faster increase to maximum boost pressure by maintaining a reservoir of boosted air stored in the second pathway of the PAI system. After t4, spark timing returns to MBT as air supply to the engine is now appropriate relative to the torque demand.

In FIG. 7, a similar set of operations as described in FIG. 6 are shown for a PAI system adapted with a splitter valve, for example, the splitter valve 401 of FIG. 1. A tip-in or tip-out is detected by a pedal position, depicted at graph 702. The position of the V-shaped valve of the splitter valve is indicated at graph 704. The V-shaped valve may be pivoted so that more ambient air, from the first pathway, is delivered to the engine than boosted air, from the second pathway, or adjusted so that more boosted air is delivered than ambient air. A middle position where the air flow to the engine comprising equal portions of ambient air from the first pathway and boosted air from the second pathway is represented by a dashed line 705. The V-shaped valve may also be positioned so that air flows exclusively from the first pathway or the second pathway. The temperature of the boosted air in the second pathway, is illustrated at graph 706 and the pressure of the boosted air supplied to the engine intake is shown at graph 708. The spark timing is depicted at graph 710 as a function of the operating conditions shown.

Prior to t1 the engine is operating at low speed with the splitter valve angled so that a first flap in the first pathway forms an opening, enabling the flow of fresh air through the first pathway to the engine. A second flap of the splitter valve is positioned perpendicular in the second pathway, blocking flow from the second pathway into the engine since boost air is not required. The CAC is not operating and the air temperature within the second pathway is close to ambient temperature and above a pre-set, non-zero temperature threshold 709. The boost pressure, as a result of the low torque demand, is also low and the spark timing is at or around MBT.

At t1, a tip-in is detected as indicated by a depression of an accelerator pedal. The tip-in activates the adjustment of the air flow to the engine: the first flap is perpendicular, blocking flow through the first pathway and the second pathway is open. As air flows through the second pathway, the air is continually cooled, resulting in a gradual decrease in the air temperature of the second pathway. The boost pressure in the second pathway increases to meet the request for increased torque while the spark timing remains at MBT.

A tip-out, detected by reduced depression of the pedal, occurs at t2. Responsive to the tip-out, the splitter valve is tilted so that the first pathway is opened and the second pathway is closed, alternating the air supply to the engine to flow fresh air instead of boosted air. As a result of the closing of the second pathway, boosted air is stored in the second pathway. Between t2 and t3, the stored air gradually warms due to heat transfer between ambient air surrounding the second pathway and the air stored within the second pathway. Boost pressure of the stored air remains relatively constant until t3 when the temperature of the second pathway exceeds the temperature threshold 709.

The threshold may be a value above which the boost provided by the air is degraded. In addition, a time threshold may elapse by t3 that is based on a rate of temperature rise calculated from inferred heat transfer and determines when the temperature of the stored air exceeds the temperature threshold 709. Responsive to the detected surpassing of the temperature and time thresholds described above, a gradual adjustment of the position of the splitter valve is performed. Opening of the second pathway is increased while flow through the first pathway is decreased, causing an undesired increase in torque. Thus the splitter valve is adjusted so that the opening in the first pathway is larger than the opening in the second pathway to regulate the amount of additional air delivered to the engine. For example, the splitter valve may be angled so that 80% of the air flow to the engine is ambient air from the first pathway while 20% of the air flow is boosted air from the second pathway. As shown in map 700 by graphs 704 and 706, the splitter valve position is biased towards the first pathway immediately after t3 and is gradually adjusted towards the middle position, indicated by dashed line 705 with the first pathway slightly more open than the second pathway until t4.

The adjustment of the splitter valve may not be able to fully compensate for the increase in air flow to the engine via the second pathway. As a result, a torque transient may occur with excess torque being produced. To address this, one or more engine operating parameters may be adjusted. For example, spark timing may be retarded from MBT. At t3, spark timing is retarded further from MBT as the flow through the second pathway is increased. A concurrent decrease in boost pressure is observed as the boosted air is released from the second pathway to the engine while the air temperature in the second pathway remains relatively constant and above the temperature threshold 609.

At t4, a second tip-in is detected and the splitter valve is angled so that first pathway is closed as the second pathway is opened. As air flows through the compressor and CAC operation in the second pathway is enabled, the air is cooled and the temperature of the boosted air in the second pathway decreases below the threshold 709. The boost pressure at t4 is lower than the boost pressure following the first tip-in between t2 and t3 but higher than the initial period up to t1. The distance between the dashed line of t1 and dashed line of t2 indicate a time for boost pressure to increase from pre-tip-in pressure at t1 to maximum boost pressure at t2, or turbo lag. Similarly, the distance between the dashed line of t4 and dashed line of t5 indicates turbo lag before boost pressure increases to maximum boost pressure following the tip-in at t4. Turbo lag following the second tip-in at t4 is shorter than turbo lag following the first tip-in at t1. This shows a faster increase to maximum boost pressure by maintaining a reservoir of boosted air stored in the second pathway of the PAI system. After t4, spark timing returns to MBT as air supply to the engine is now appropriate relative to the torque demand.

In this way, boosted air may be stored in a PAI system so that boost is readily available during an increase in engine load. By discharging the stored air during a tip-in while a compressor spools up, turbo lag is reduced. By including an air pathway that bypasses a compressor and CAC, ambient air can be rapidly provided to the engine at low loads. Furthermore, when the stored air is warmed above a threshold and has lower boosting ability, the stored air is can be vented. The technical effect of coupling the PAI system to an engine is that turbo lag is minimized when higher engine torque is requested by maintaining a supply of cool, boosted air in the ducting.

As an embodiment, a boosted engine method includes: at higher engine load, drawing cool compressed air into an engine via an air intake passage; at lower engine load, drawing ambient air into the engine via a duct while retaining cooled compressed air in the air intake passage; and releasing the compressed air from the air intake passage based on heat transferred to the compressed air during the lower engine load. In a first example of the boosted engine method, estimating the heat transferred to the compressed air retained in the air intake passage is based on ambient conditions including ambient temperature and humidity, the heat transferred is increased as the ambient temperature increases and/or as the ambient humidity decreases. A second example of the boosted engine method optionally includes the first example and further includes, wherein retaining the cooled compressed air includes closing a throttle coupled downstream of an intake compressor in the air intake passage, and wherein the heat transferred is determined as a function of an initial temperature of the cooled compressed air and a duration elapsed since the closing of the throttle. A third example of the boosted engine method optionally includes one or more of the first and second examples, and further includes, wherein the compressed air is released responsive to higher than threshold heat transfer while at the lower engine load. A fourth example of the boosted engine method optionally includes the first through third examples, and further includes, responsive to lower than threshold heat transfer while at the lower engine load, releasing the compressed air responsive to an increase in operator torque demand. A fifth example of the boosted engine method optionally includes the first through fourth examples, and further includes, wherein the air intake passage is coupled to the duct at a location upstream of an intake compressor. A sixth example of the boosted engine method optionally includes the first through fifth examples, and further includes, wherein drawing cool compressed air at the higher engine load includes increasing an opening of a boost throttle coupled in the air intake passage to draw air via the intake compressor, and through a charge air cooler located downstream of the compressor, into the engine, and wherein retaining cooled compressed air in the air intake passage at the lower engine load includes not flowing air through the compressor and closing the boost throttle. A seventh example of the boosted engine method optionally includes the first through sixth examples, and further includes, decreasing the opening of an air throttle coupled in the duct at the higher engine load, the decreasing the opening of the air throttle based on the increasing the opening of the boost throttle. An eighth example of the boosted engine method optionally includes the first through seventh examples, and further includes, wherein releasing the compressed air includes: increasing the opening of the boost throttle while at the lower engine load; decreasing the opening of the air throttle based on the opening of the boost throttle; and retarding spark timing based on engine torque with the increased opening of the boost throttle relative to operator torque demand at the lower engine load. A ninth example of the boosted engine method optionally includes the first through eighth examples, and further includes, wherein coolant is circulated through the charge air cooler while drawing cool compressed air into the engine via the air intake passage, and wherein coolant is not circulated through the charge air cooler while retaining the compressed air in the air intake passage.

As an embodiment, a method for a boosted engine includes: responsive to a tip-in, increasing a boost throttle opening to draw cool compressed air from downstream of a charge air cooler (CAC) into an engine via a boost passage; responsive to a tip-out, increasing an air throttle opening to draw ambient air from upstream of the CAC into the engine via an air passage while retaining the compressed air in the boost passage; and opening the boost throttle following the tip-out based on heat transfer to the compressed air in the duct relative to operator torque demand. In a first example of the boosted engine method, opening the boost throttle following the tip-out includes: opening the boost throttle in response to heat transfer to the compressed air in the duct being higher than a threshold amount while operator torque demand is below a threshold demand; and opening the boost throttle in response to an increase in operator torque demand to higher than the threshold demand while heat transfer to the compressed air in the duct is lower than the threshold amount. A second example of the boosted engine method optionally includes the first example and further includes, responsive to opening the boost throttle while operator torque demand is below the threshold demand, adjusting one or more engine operating parameters to reduce engine torque output, the adjusting including retarding spark timing, adjusting fuel injection timing, adjusting valve timing, and adjusting a split ratio of fuel delivered via direct injection relative to port injection. A third example of the boosted engine method optionally includes one or more of the first and second examples, and further includes, wherein the boost passage includes a pressure relief valve upstream of the compressor, the boost passage is coupled to the air passage upstream of the pressure relief valve, increasing the boost throttle opening includes decreasing the air throttle opening, and increasing the air throttle opening includes decreasing the boost throttle opening. A fourth example of the boosted engine method optionally includes the first through third examples, and further includes, estimating the heat transfer to the compressed air based on each of ambient temperature and ambient humidity, the heat transfer increased as the ambient temperature increases and the ambient humidity decreases. As an embodiment, a boosted engine system includes: an engine; a first air intake passage coupled to the engine via a first throttle; a second air intake passage housing a pressure relief valve, a compressor located downstream of the valve, and a charge air cooler located downstream of the compressor, the second air intake passage coupled to the engine via a second throttle, the first air intake passage coupled to the second air intake passage upstream of the pressure relief valve; an ambient temperature sensor and an ambient humidity sensor coupled to the first air intake passage; an accelerator pedal for receiving an operator torque demand; and a controller with computer-readable instructions stored on non-transitory memory for: adjusting an opening of the first throttle relative to the second throttle based on the operator torque demand; and while operating with the second throttle fully closed, adjusting a timing of opening the second throttle based on a rate of rise in temperature of the compressed air trapped in the second air intake passage. In a first example of the boosted engine system, wherein the adjusting the opening of the first throttle relative to the second throttle includes: as the operator torque demand exceeds a threshold demand, increasing the opening of the second throttle relative to the first throttle; and as the operator torque demand falls below the threshold demand, increasing the opening of the first throttle relative to the second throttle, and trapping an amount of air in the second air intake passage. A second example of the boosted engine method optionally includes the first example and further includes, wherein the controller includes further instructions for: estimating the rate of rise in temperature of the compressed air trapped in the second air intake passage based on each of measured ambient temperature, measured ambient humidity, initial temperature of the compressed air at a time of fully closing the second throttle, and a duration elapsed since the full closing of the second throttle, the amount of heat transferred increased as one or more of the ambient temperature increases, the ambient humidity decreases, the initial temperature increases, and the elapsed duration increases. A third example of the boosted engine system optionally includes one or more of the first and second examples, and further includes, wherein adjusting the timing of opening the second throttle includes: transiently opening the second throttle to release the trapped compressed air when the rate of temperature rise of the trapped compressed air is higher than a threshold amount while the operator torque demand is below the threshold demand; and opening the second throttle while spooling up the compressor when the rate of temperature rise of the trapped compressed air is lower than the threshold amount while the operator torque demand exceeds the threshold demand. A fourth example of the boosted engine system optionally includes the first through third examples, and further includes, wherein the controller includes further instructions for: retarding spark timing from MBT while transiently opening the second throttle; and maintaining spark timing at MBT while opening the second throttle and spooling up the compressor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   estimating operating conditions of the engine and determining that the engine is being operated at a first engine load via an electronic controller;
   responsive to determining that the engine is being operated at the first engine load, where the first engine load is lower than a second engine load, adjusting a valve via the electronic controller, and storing cooled boost air in an intake passage while simultaneously flowing ambient air into an intake manifold of the engine for combustion via a duct; and then
   determining an inferred temperature of the stored cooled boost air has exceeded a threshold temperature via the electronic controller; and
   responsive to determining the inferred temperature of the stored cooled boost air has exceeded the threshold temperature, adjusting the valve via the electronic controller, and decreasing an amount of the ambient air flowed into the intake manifold of the engine for combustion and flowing the stored cooled boost air to the intake manifold for combustion.

2. The method of claim 1, wherein the valve is a boost throttle coupled to the intake passage is opened to flow the stored cooled boost air to the intake manifold.

3. The method of claim 2, wherein the boost throttle is further opened to flow the cooled boost air into the intake manifold responsive to a period of time that the cooled boost air has been stored in the intake passage exceeding a time threshold.

4. The method of claim 1, wherein decreasing the amount of the ambient air flowed into the intake manifold of the engine includes adjusting a position of an air throttle coupled in the duct to a more closed position.

5. The method of claim 1, further comprising, at higher engine load, drawing further cooled boost air directly into the intake manifold of the engine via the intake passage.

* * * * *